(12) United States Patent
Jaeger et al.

(10) Patent No.: US 9,266,175 B2
(45) Date of Patent: Feb. 23, 2016

(54) CUTTING INSERT AND A MILLING TOOL

(71) Applicant: SANDVIK INTELLECTUAL PROPERTY AB, Sandviken (SE)

(72) Inventors: Sebastien Jaeger, Tours (FR); Patrick Huteau, Saint Cyr sur Loire (FR)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 248 days.

(21) Appl. No.: 13/680,184

(22) Filed: Nov. 19, 2012

(65) Prior Publication Data
US 2013/0129432 A1 May 23, 2013

(30) Foreign Application Priority Data
Nov. 23, 2011 (EP) .................................... 11190332

(51) Int. Cl.
| | | |
|---|---|---|
| B23C 5/20 | (2006.01) | |
| B23C 5/22 | (2006.01) | |
| B23C 5/06 | (2006.01) | |
| B23C 5/10 | (2006.01) | |

(52) U.S. Cl.
CPC . *B23C 5/207* (2013.01); *B23C 5/06* (2013.01); *B23C 5/109* (2013.01); *B23C 5/2221* (2013.01); *B23C 5/2247* (2013.01); *B23B 2200/3681* (2013.01); *B23C 2200/0444* (2013.01); *B23C 2200/0455* (2013.01); *B23C 2200/0477* (2013.01); *B23C 2200/125* (2013.01); *B23C 2200/128* (2013.01); *Y10T 407/1924* (2015.01); *Y10T 407/23* (2015.01)

(58) Field of Classification Search
CPC .... B23C 2200/125; B23C 5/06; B23C 5/207; B23C 5/109; B23C 5/2221; B23C 5/2247; B23C 5/202; B23C 2200/0444; B23C 2200/0455; B23C 2200/0477; B23C 2200/128; B23B 27/145; B23B 2200/2681
USPC .................. 407/113, 114, 33, 34, 42, 48, 102
See application file for complete search history.

(56) References Cited

U.S. PATENT DOCUMENTS

| | | | | |
|---|---|---|---|---|
| 3,142,110 | A | * | 7/1964 | Hertel ............................ 407/114 |
| 3,490,117 | A | * | 1/1970 | Hertel ............................ 407/104 |
| 4,074,949 | A | * | 2/1978 | Hochmuth et al. ........... 407/114 |
| 4,294,566 | A | * | 10/1981 | Boone ........................... 407/114 |

(Continued)

FOREIGN PATENT DOCUMENTS

| | | |
|---|---|---|
| WO | 2011046121 A1 | 4/2011 |
| WO | 2011121787 A1 | 10/2011 |

*Primary Examiner* — Sunil K Singh
*Assistant Examiner* — Sara Addisu
(74) *Attorney, Agent, or Firm* — Corinne R. Gorski

(57) ABSTRACT

A cutting insert for face milling and ramping includes an upper side defining an upper extension plane, a lower side defining a lower extension plane parallel with the upper extension plane, and an edge side extending around the cutting insert. A center axis extends perpendicularly through the upper and lower extension planes. An upper cutting edge forms four upper cutting edge portions having an identical length corresponding to a determined angle with respect to the center axis. A lower cutting edge forms four lower cutting edge portions (26), having an identical length corresponding to the determined angle with respect to the center axis. Each upper cutting edge portion is displaced angularly with respect to the center axis in relation to one of the lower cutting edge portions with a displacement angle being greater than zero and less than the determined angle.

12 Claims, 7 Drawing Sheets

(56) References Cited

U.S. PATENT DOCUMENTS

| | | | |
|---|---|---|---|
| 4,539,875 A * | 9/1985 | Lee et al. | 82/1.11 |
| 4,729,697 A * | 3/1988 | Lacey | 407/42 |
| 4,966,500 A * | 10/1990 | Tsujimura | B23C 5/2221 407/113 |
| 5,213,452 A * | 5/1993 | Kirby | B23C 5/1081 407/118 |
| 5,893,683 A * | 4/1999 | Johnson | B23C 5/109 407/113 |
| 5,984,592 A * | 11/1999 | Harper | B23C 5/109 407/34 |
| 6,196,770 B1 * | 3/2001 | Astrom et al. | 407/40 |
| 6,742,969 B1 | 6/2004 | Hoefler | |
| 6,773,209 B2 * | 8/2004 | Craig | 407/63 |
| 7,014,395 B2 * | 3/2006 | Daiguji | B23C 5/109 407/113 |
| 7,252,460 B2 * | 8/2007 | Rieth | 407/113 |
| 7,419,338 B2 * | 9/2008 | Smilovici et al. | 407/113 |
| 7,597,507 B2 * | 10/2009 | Sakamoto | B23C 5/109 407/113 |
| 8,277,151 B2 * | 10/2012 | Wandeback | 407/42 |
| 8,282,320 B2 * | 10/2012 | Hartlohner et al. | 407/113 |
| 8,434,974 B2 * | 5/2013 | Spitzenberger | 407/55 |
| 8,454,277 B2 * | 6/2013 | Dudzinsky et al. | 407/67 |
| 8,454,278 B2 * | 6/2013 | Hartlohner et al. | 407/113 |
| 8,641,331 B2 * | 2/2014 | Zastrozynski et al. | 407/113 |
| 2008/0170916 A1 * | 7/2008 | Ballas | B23C 5/109 407/42 |
| 2008/0226403 A1 * | 9/2008 | Craig | 407/113 |
| 2010/0303563 A1 * | 12/2010 | Fang et al. | 407/113 |
| 2011/0299946 A1 * | 12/2011 | Hecht | B23C 5/207 407/42 |
| 2013/0121775 A1 * | 5/2013 | Dudzinsky | B23C 5/2221 407/42 |
| 2014/0064864 A1 * | 3/2014 | Kaufmann et al. | 407/114 |
| 2014/0161545 A1 * | 6/2014 | Inagaki | B23B 27/1603 407/42 |
| 2014/0234036 A1 * | 8/2014 | Atar | B23C 5/109 407/40 |
| 2014/0234037 A1 * | 8/2014 | Horiike et al. | 407/47 |
| 2015/0037106 A1 * | 2/2015 | Kovac | B23C 5/207 407/33 |
| 2015/0139743 A1 * | 5/2015 | Ballas | B23C 5/109 407/48 |

* cited by examiner

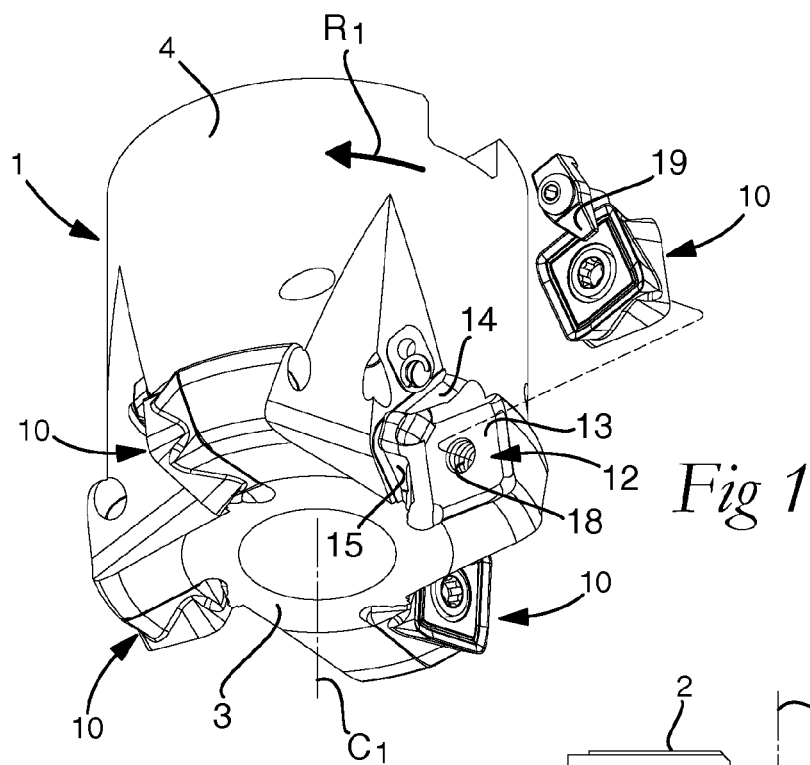
*Fig 1*
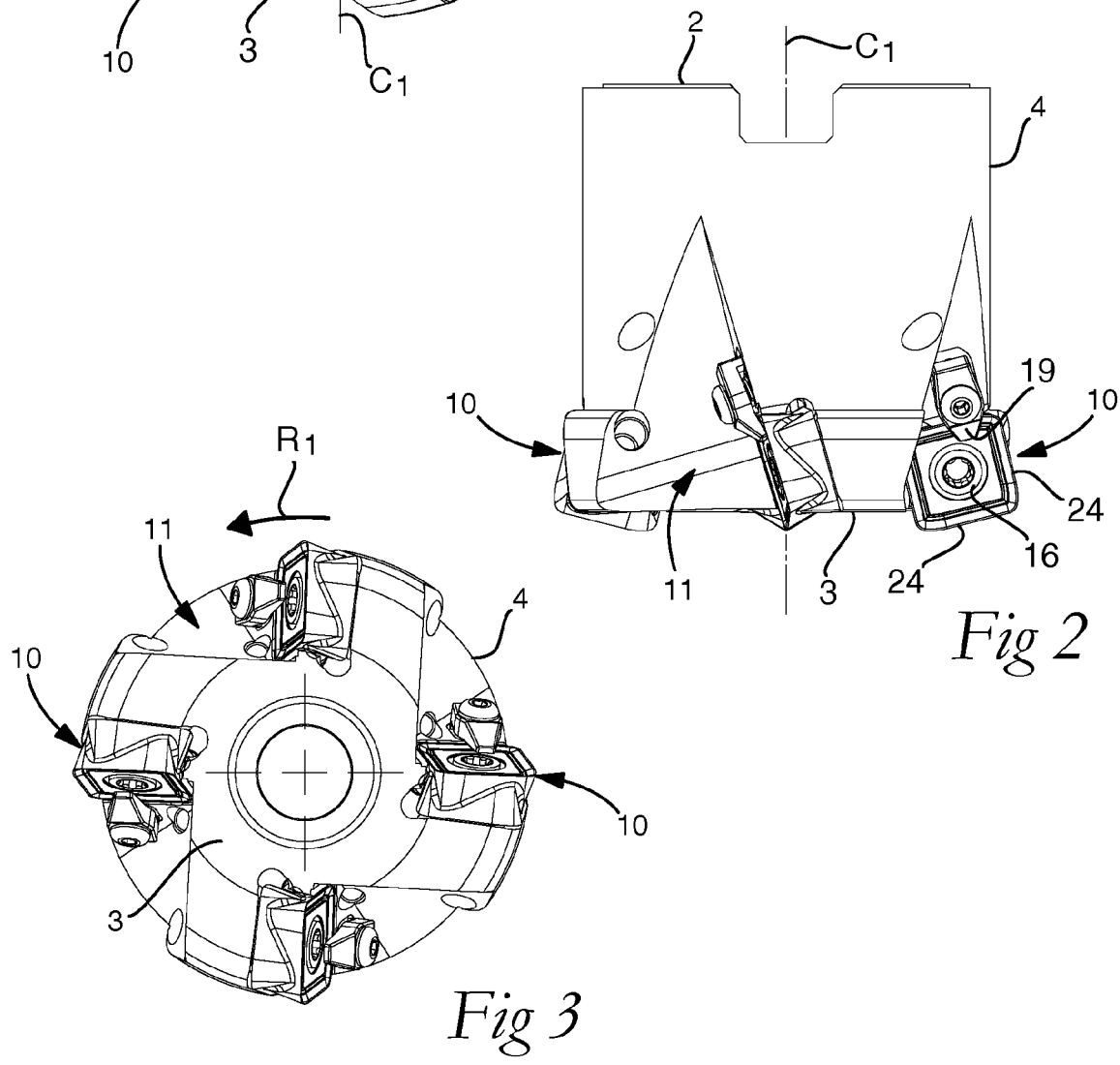
*Fig 2*
*Fig 3*

CUTTING INSERT AND A MILLING TOOL

RELATED APPLICATION DATA

This application claims priority under 35 U.S.C. §119 to European Patent Application No. 11190332.4, filed on Nov. 23, 2011, which the entirety thereof is incorporated herein by reference.

TECHNICAL FIELD OF THE INVENTION

The present invention refers to a cutting insert configured for chip-removing machining and for being mounted in a cutter body for face milling and ramping of a workpiece. The present invention also refers to a milling tool having a cutter body and a number of such cutting inserts.

In the cutting insert of the present invention, the geometries, including chip forming configurations, are located on the upper side and the lower side of the cutting insert. This is in contrast to prior art cutting inserts having the geometries located on the periphery of the cutting insert, as shown in US 2010/0129166, for instance.

US 2010/0303563 discloses a cutting insert configured for milling operations, such as face milling, slot milling, plunge milling and ramping. The known cutting insert comprises an upper side defining an upper extension plane and a lower side defining a lower extension plane being parallel with the upper extension plane. A center axis extends perpendicularly through the upper extension plane and the lower extension plane. An upper cutting edge extends around the upper side and forms three or more upper cutting edge portions, each having a length corresponding to a determined angle with respect to the centre axis. A lower cutting edge extends around the lower side and forms three or more lower cutting edge portions, each having a length corresponding to said determined angle with respect to the center axis. An edge side extends around the cutting insert.

The cutting insert of US 2010/0303563 is indexable for permitting cutting with at least one of the upper cutting edge portions with the upper side forming a chip surface, or at least one of the lower cutting edge portions with the lower side forming a chip surface. The length of each of the upper cutting edge portions is equal to the length of each of the lower cutting edge portions.

Moreover, the upper side of the cutting insert of US 2010/0303563 is twisted or rotated in relation to the lower side with respect to an axis extending perpendicularly to the center axis in a virtual middle plane of the cutting insert so that the upper side forms a mirror image of the lower side. Due to this configuration, the cutting insert is single-handed.

With a standard negative square cutting insert, it is not possible to obtain a unique axial and radial position of the cutting insert in a cutter body that allows alternating high-feed face milling and ramping with relief of the insert without changing the position of the cutting inserts in the cutter body. The problem is not the same with a positive insert where the relief is natural due to the clearance angle.

SUMMARY OF THE INVENTION

The object of the present invention is to overcome the problems discussed above and to provide an indexable cutting insert enabling all cutting edges to be used efficiently in complicated milling operations.

This object is achieved by the cutting insert initially defined, which is characterised in that each upper cutting edge portion is displaced angularly with respect to the center axis in relation to one of the lower cutting edge portions with a displacement angle being greater than zero and less than said determined angle.

By such a cutting insert, which is indexable by being rotated both around the center axis and around an axis being perpendicular to the center axis, all cutting edge portions with respect to the upper side and the lower side may be used efficiently in various complicated milling operations including face milling and ramping, especially in a combined operation involving face milling in one direction and ramping in the opposite direction. The inventive solution thus lies in assembling two cutting inserts angularly displaced, or twisted, one relative to the other, i.e. with an angular offset between the cutting insert forming the upper side and the cutting insert forming the lower side. Thanks to this configuration relief is ensured, i.e. it is ensured that none of the lower cutting edge portions or any other part of the cutting insert will interfere with the workpiece when one or more of the upper cutting edge portions is in an active cutting position and in engagement with the workpiece. The angular displacement of the upper and lower cutting edge portions allows freeing of the lower cutting edge from the working area of the upper cutting edge. The lower cutting edge portions are consequently protected when in a passive position and not used for machining.

According to an embodiment of the invention, the edge side comprises a transition portion extending around the cutting insert and dividing the edge side into an upper side portion associated with the upper cutting edge and a lower side portion associated with the lower cutting edge. The transition portion that links the two side portions may be a fillet. The transition portion separates the upper side portion from the lower side portion, which then may be configured independently from each other with respect to clearance and support of the cutting insert.

According to a further embodiment of the invention, the upper side portion comprises at least two upper side surfaces associated with a respective one of the upper cutting edge portions, wherein the lower side portion comprises at least two lower side surfaces associated with a respective one of the lower cutting edge portions. Advantageously, each of upper and lower side surfaces may be configured to form a clearance surface in one of said index positions and configured to form a support surface in another of said index positions and thus to abut a support surface of said cutter body when being mounted in the cutter body.

According to a further embodiment of the invention, the upper side portion forms an acute angle with the upper extension plane, and the lower side portion forms an acute angle with the lower extension plane. Advantageously, each upper side surface may form an acute angle with the upper extension plane with respect to the associated upper cutting edge portion and each lower side surface may form an acute angle with the lower extension plane with respect to the associated lower cutting edge portion. Consequently, the cutting insert will have a positive cutting geometry for all upper cutting edge portions and all lower cutting edge portions. The acute angle may be the same for the different side surfaces, or different for different side surfaces.

The cutting insert thus combines the advantage of the positive insert, which has a natural relief, and the negative reversible insert with two times more cutting edge portions to allow alternating ramping and face milling without changing the position of the cutting inserts in the cutter body. A particularly advantageous solution thus lies in assembling two positive cutting inserts twisted one relative to the other, i.e. with an angular offset or displacement between them.

According to a further embodiment of the invention, the transition portion has a wave-like shape, or wave shape, seen in a direction parallel to the upper and lower extension planes. The wave-like shape does not need to be regular. The wave-like shape may be progressive and sinusoidal in order to have a side surfaces allowing flank wear of more than the half width of the edge side.

According to a further embodiment of the invention, the transition portion comprises a groove extending around the cutting insert. Such a groove, extending along the edge side around the whole cutting insert, provides a complete separation of the upper side portion and the lower side portion from each other.

According to a further embodiment of the invention, the displacement angle is greater than zero and less than 50% of said determined angle, preferably greater than zero and less than 40% of said determined angle, more preferably greater than zero and less than 30% of said determined angle, and most preferably greater than zero and less than 20% of said determined angle.

According to a further embodiment of the invention, the upper cutting edge portions and the lower cutting edge portions are identical. Thus each cutting edge portion of the cutting insert is identical all other cutting edge portions of the cutting insert with respect to the length and the shape with.

According to a further embodiment of the invention, the upper cutting edge is configured in such a manner that one of the upper cutting edge portions forms a main cutting edge and an adjacent upper cutting edge portion forms a minor cutting edge in one of said index positions, and the lower cutting edge is configured in such a manner that one of the lower cutting edge portions forms a main cutting edge and an adjacent lower cutting edge portion forms a minor cutting edge in another one of said index positions. For instance, the main cutting edge may substantially perform face milling whereas the adjacent minor cutting edge may perform ramping.

According to a further embodiment of the invention, the upper cutting edge comprises three upper cutting edge portions and the lower cutting edge comprises three lower cutting edge portions. However, the upper cutting edge and the lower cutting edge may also comprise four, five or more upper cutting edge portions and lower cutting edge portions, respectively. The cutting insert according to the invention is thus applicable to various geometrical shapes, such as triangular, square, pentagonal, etc. shapes. Also cutting inserts with only two upper cutting edge portions and two lower cutting edge portions are possible.

According to a further embodiment of the invention, the cutting insert is single-handed, i.e. the cutting insert offers the same cutting geometries for the upper side and the lower side, and may be used for rotation of the cutter body in the same direction irrespective of which of the upper edge and the lower edge being in the active cutting position.

According to a further embodiment of the invention, the cutting insert is configured for alternating face milling and ramping of the workpiece.

The object is also achieved by the milling tool initially defined, wherein the cutting inserts are mounted in the cutter body and configured to permit alternating face milling and ramping of said workpiece.

BRIEF DESCRIPTION OF THE DRAWINGS

The present invention is now to explained more closely by means of the following description of preferred embodiments and with reference to the drawings attached hereto.

FIG. 1 discloses a perspective view of a milling tool with a cutter body carrying a plurality of cutting inserts according to a first embodiment of the invention.

FIG. 2 discloses a side view of the cutter body in FIG. 1.

FIG. 3 discloses a front view of the cutter body in FIG. 1.

DETAILED DESCRIPTION OF VARIOUS EMBODIMENTS OF THE INVENTION

Figure 4:
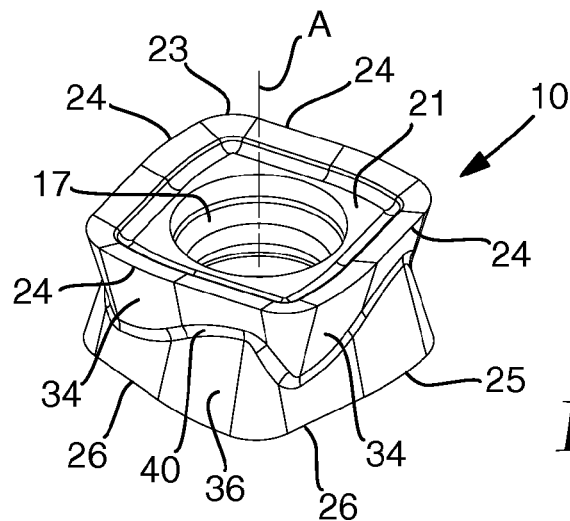
FIG. 4 discloses a perspective view of the cutting insert according to the first embodiment.

FIG. 1 discloses a cutter body 1 for a machine tool and forming a part of a milling tool configured to be used for alternating face milling and ramping. During ramping, the milling tool is fed simultaneously in a lateral direction and a forward direction. The milling tool is configured for chip-removing machining of workpieces, especially of metallic materials, such as steel, aluminium, etc.

The cutter body 1 has a rear connection face 2 adapted to be connected to a machine tool (not disclosed) or an intermediate tool element (not disclosed) to be connected to the machine tool. The cutter body 1 also has a front face 3 opposite to the rear face 2, and a peripheral face 4 extending around the cutter body 1 between the rear face 2 and the front face 3. The cutter body 1 is configured to rotate in a rotary direction $R_1$ around an axis $C_1$ of rotation also forming a longitudinal center axis of the cutter body 1. The axis $C_1$ of rotation extends through the rear face 2 and through the front face 3, preferably perpendicularly, and in parallel with the peripheral face 4.

The milling tool comprises a plurality of cutting inserts 10 which are mounted in the cutter body 1. The cutting inserts 10 are replaceable. The cutting inserts 10 are manufactured in harder material than the cutter body 1, such as hard metal, cemented carbide, ceramics, etc. The cutter body 1 may be manufactured in steel.

The cutter body 1 comprises a plurality of recesses 11 each configured to house a respective one of the cutting inserts 10. In the embodiment disclosed in FIGS. 1 to 3, the milling tool comprises four cutting inserts 10 and four recesses 11. It is to be noted that the milling tool may comprise less or more than four cutting inserts 10 and recesses 11, for instance three, five, six, seven, eight etc. cutting inserts 10 and recesses 11.

Each recess 11 comprises a seat 12 for the cutting insert 10. The seat 12 is configured to form a support for the cutting insert 10. As can be seen in FIG. 1, where one of the cutting inserts 10 is illustrated beside the seat 12, the seat 12 comprises a bottom support surface 13, a main side support surface 14 and a minor side support surface 15. The cutting insert 10 will, when mounted in the seat 12, extend laterally beyond the peripheral surface 4 and forwardly beyond the front face 3, as can be seen in FIGS. 1 to 3. The cutting inserts 10 are, when mounted in the cutter body 1, arranged along a circular path around the axis $C_1$ of rotation. The circular path extends in a plane to which the axis $C_1$ of rotation is perpendicular.

Figure 5:
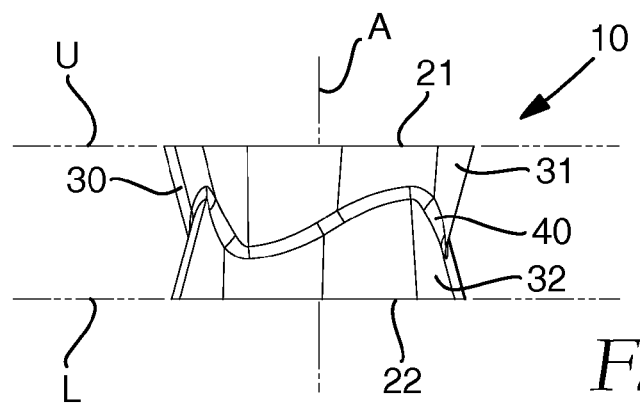
FIG. 5 discloses a side view of the cutting insert in FIG. 4.
Figure 6:
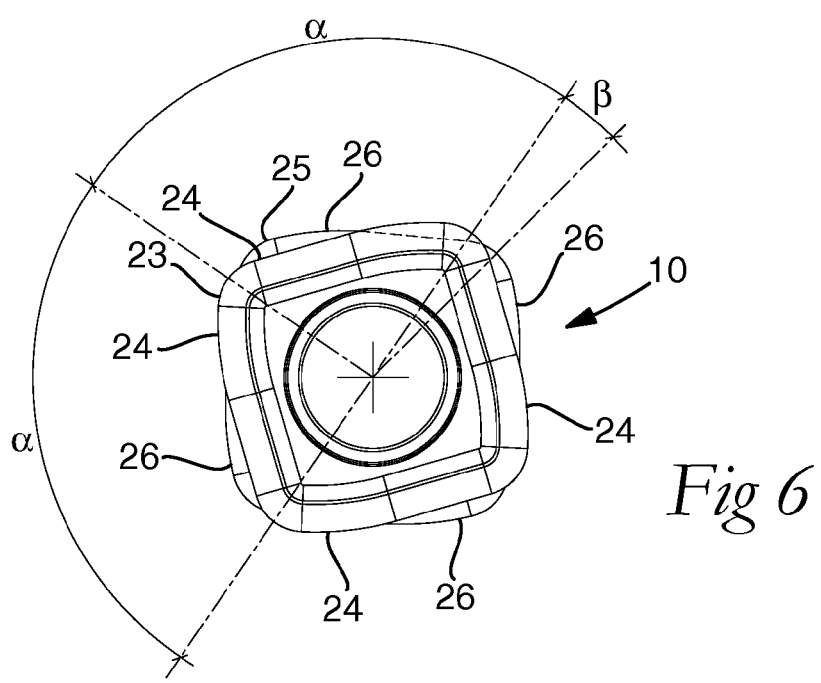
FIG. 6 discloses a front view of the cutting insert in FIG. 4.

In the embodiment disclosed in FIGS. 1 to 3, the cutting insert 10 is secured in the respective seat 11 by means of a fastening screw 16 extending through a center hole 17, see FIGS. 4 to 6, in the cutting insert 10 into a fastening hole 18 through the bottom support surface 13.

In addition, the cutting insert 10 is further secured by means of a clamp having clamping arm 19 engaging the cutting insert 10.

The first embodiment of the cutting insert 10, mounted in the cutter body 1 in FIGS. 1 to 3, is disclosed more closely in FIGS. 4 to 6. The cutting insert 10 comprises an upper side 21 defining an upper extension plane U, and a lower side 22 defining a lower extension plane L being parallel with the upper extension plane U. A center axis A extends perpendicularly through the upper extension plane U and the lower extension plane L. The center hole 17 extends through the upper side 21 and the lower side 22 in parallel and concentrically with the centre hole 17.

An upper cutting edge 23 extends around the upper side 21 and forms four upper cutting edge portions 24. Each upper cutting edge portion 24 has a length corresponding to a determined angle α with respect to the center axis A. A lower cutting edge 25 extends around the lower side 22 and forms four lower cutting edge portions 26. Each lower cutting edge portion 26 also has a length corresponding to said determined angle α with respect to the center axis A. For the cutting insert 10 of the first embodiment, which has four upper cutting edge portions 24 and four lower cutting edge portions 26, and an overall square shape, the determined angle α is 90°. The transition between the cutting edge portions 24, 26 is rounded as can be clearly seen in FIG. 6. This is accomplished by a slight bending of the two opposite ends of each cutting edge portion 24, 26. In addition to the bent ends, the cutting edge portions 24, 26 also include a slight convex curvature between the bent ends.

The length of each of the upper cutting edge portions 24 is equal to the length of each of the other upper cutting edge portions 24. The length of each of the lower cutting edge portions 26 is equal to the length of each of the other lower cutting edge portions 26. Moreover, the length of each of the upper cutting edge portions 24 is equal to the length of each of the lower cutting edge portions 26. In other words, in the embodiments disclosed, all the cutting edge portions 24, 26 are identical with respect to the length and to the shape of the cutting edge portion 24, 26. The lower side 22 can be seen as a mirror image of the upper side 21 in that the lower side 22 is rotated 180° around an imaginary axis being perpendicular to the center axis A.

The cutting insert 10 is indexable to different index positions. In one index position, the upper cutting edge 23 is cutting, wherein the upper side 21 forms a chip surface or rake surface and the lower side 22 forms a support surface resting on the bottom support surface 13 of the seat 12. In another index position, the lower cutting edge 25 is cutting, wherein the lower side 22 forms a chip surface or rake surface, and the upper side 21 forms a support surface resting on the bottom support surface 13 of the seat 12. The chip surface formed by or in the upper side 21 and the lower side 22 is in the first embodiment depressed to provide advantageous chip forming properties, see in particularly FIG. 4.

Figure 19:
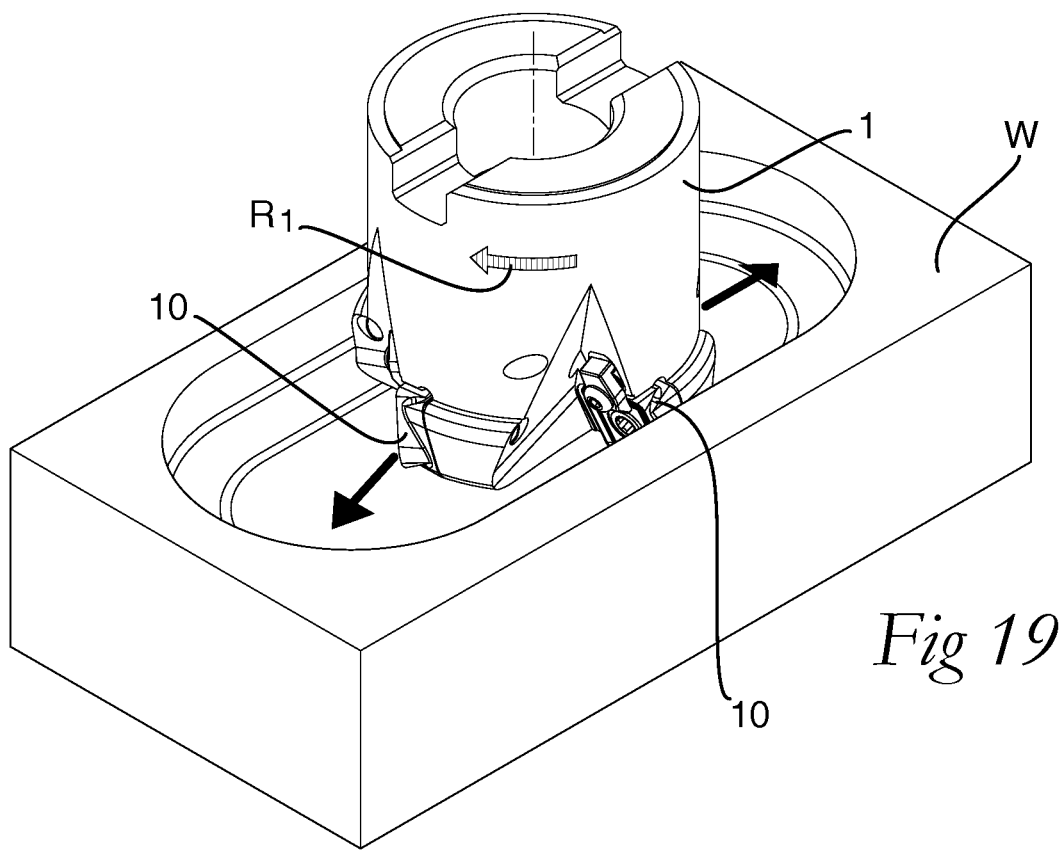
FIG. 19 discloses a perspective view of milling till in FIG. 1 during machining of a workpiece.
Figure 20:
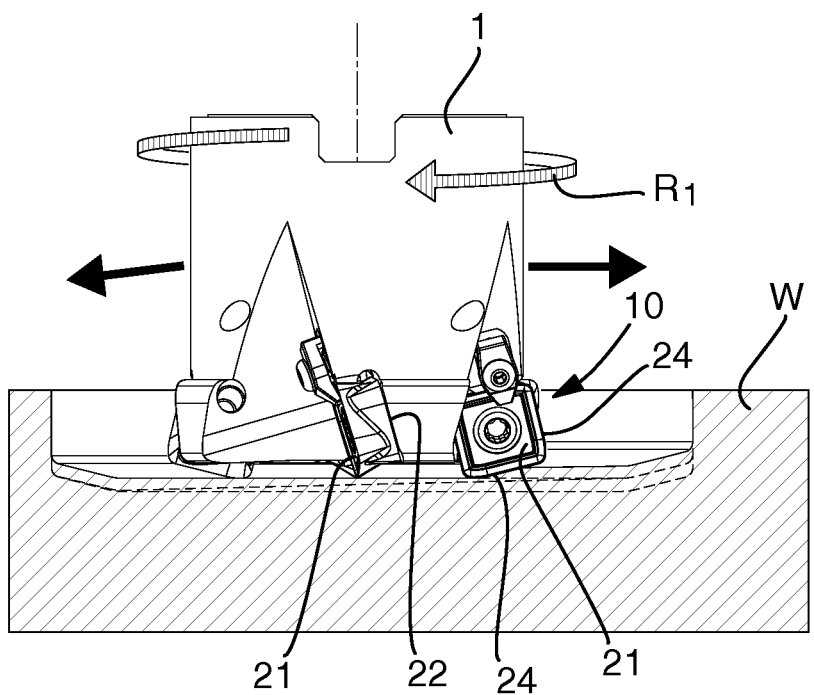
FIG. 20 discloses a side view of the tool and workpiece in FIG. 19, wherein the workpiece is sectioned.

The upper cutting edge 23 is configured in such a manner that one of the upper cutting edge portions 24 forms a main cutting edge and an adjacent upper cutting edge portion 24 forms a minor cutting edge in one of the index positions, see especially FIGS. 19 and 20, which illustrate the cutting insert 10 in engagement with a workpiece W. For the sake of clarity, the cutting depth is exaggerated. The main cutting edge performs face milling when the milling tool is moved to the right in FIG. 20. The adjacent minor cutting edge performs ramping when the milling tool is moved to the left in FIG. 20. Likewise the lower cutting edge 25 is configured in such a manner that one of the lower cutting edge portions 26 forms a main cutting edge and an adjacent lower cutting edge portion 26 forms a minor cutting edge in another one of the index positions. The convex curvature mentioned above is advantageous and adapts the cutting edge portions 24, 26 to proper face milling of a bottom surface of the workpiece W and proper lateral milling of the lateral surfaces of the workpiece W.

An edge side 30 extends around the cutting insert 10. The edge side 30 comprises a transition portion extending around the cutting insert 10 and dividing the edge side 30 into an upper side portion 31 and a lower side portion 32. The upper side portion 31 is associated with, or connected to, the upper cutting edge 23. The lower side portion 32 is associated with or connected to the lower cutting edge 25.

The upper side portion 31 comprises four upper side surfaces 34 associated with a respective one of the upper cutting edge portions 24. The lower side portion 32 comprises four lower side surfaces 36 associated with a respective one of the lower cutting edge portions 26.

Each of the upper side surfaces 34 and the lower side surfaces 36 is configured to form a clearance surface in one of said index positions and configured to form a support surface in another of said index positions, in which the it abuts the major side support surface 14 or the minor side support surface 15 of one of the seats 12 of the cutter body 1 when the cutting insert 10 is mounted in the seat 12.

The upper side portion 31 forms an acute angle with the upper extension plane U, and the lower side 32 portion forms an acute angle with the lower extension plane L, see especially FIG. 5. More specifically, each upper side surface 34 forms an acute angle with the upper extension plane U with respect to the associated upper cutting edge portion 24, and each lower side surface 36 forms an acute angle with the lower extension plane L with respect to the associated lower cutting edge portion 26. Consequently, the cutting insert 10 will have a positive cutting geometry for all upper cutting edge portions 24 and all lower cutting edge portions 26. The acute angle could be the same for the different side surfaces, or different for different side surfaces.

As can be seen in FIGS. 4 and 5, the transition portion has a wave-like shape seen in a direction parallel to the upper extension plan U and the lower extension plane L. The wave-like shape is irregular in the sense that the distance between one of the peaks and the adjacent valley is shorter that the distance between said one peak and the other adjacent valley. The transition portion is in the first embodiment configured as a transition area 40 having a uniform width along the length of the transition area 40 along the whole edge side 30. The width of the transition area 40 is in the first embodiment significantly smaller that the width of the upper side portion 31 and the lower side portion 32.

As can be seen in especially FIG. 6, each upper cutting edge portion 24 is displaced angularly with respect to the center axis A in relation to one of the lower cutting edge portions 26 with a displacement angle β, which is greater than zero and less than the determined angle α. It is to be noted that the displacement angle β advantageously may be smaller, or significantly smaller, than determined angle α. In particular, the displacement angle β may be greater than zero and less than 50% of the determined angle α, preferably greater than zero and less than 40% of the determined angle α, more preferably greater than zero and less than 30% of the determined angle α, or most preferably greater than zero and less than 20% of the determined angle α.

The displacement angle β depends on the number of cutting edge portions 24, 26, or the overall shape of the cutting insert 10, i.e. if the cutting insert 10 has a triangular shape, a square shape, a pentagonal shape etc. seen from above along the direction of the center axis A. The more cutting edge portions 24, 26, the smaller is the upper limit for the displacement angle β.

Consequently, the upper side 21 is not only rotated 180° in relation to the lower side 22 around an imaginary axis being perpendicular to the center axis A as mentioned above, but also rotated around the center axis A in relation to the lower side 21 with the displacement angle β. With this configuration and due to the identical configuration of the upper side 21 and the lower side, the cutting insert 10 is single-handed, i.e. milling tool and the cutter body 1 will always rotate in the same rotary direction $R_1$ independent of the index position of the different cutting inserts 10.

FIGS. 19 and 20 illustrate the milling tool with the cutting inserts 10 according to the first embodiment in a machining operation of a workpiece W involving face milling in one direction and ramping in the opposite direction. It can be seen that the upper side 21 of the cutting inserts 10 is in engagement with the workpiece W, wherein the one of the upper cutting edge portions 24 forms a major cutting edge machining the bottom of a recess made in the workpiece when the milling tool is moved horizontally, whereas an adjacent upper cutting edge portion 24 forms minor cutting edge machining the bottom surface of the recess of the workpiece when the milling tool is ramped, i.e. moved laterally and downwardly. It can also be seen that the lower cutting edge 25, as well as all other parts of the cutting inserts 10, is not in engagement with the workpiece. Thanks to the displacement of the lower side 22 in relation to the upper side 21, the lower cutting edge will thus be free from any contact with the workpiece W.

Further embodiments of the cutting insert 10 will now be described. It is to be noted that the same reference sign designate the same or a similar element in all embodiments disclosed.

Figure 7:
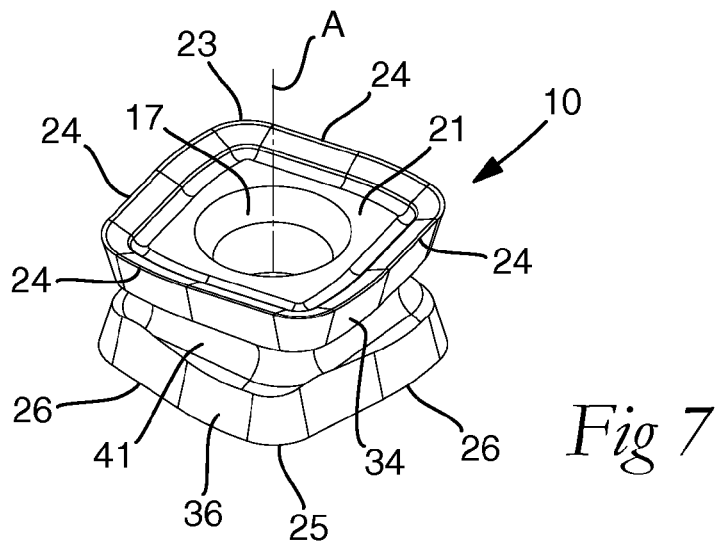
FIG. 7 discloses a perspective view of a cutting insert according to a second embodiment of the invention.
Figure 8:
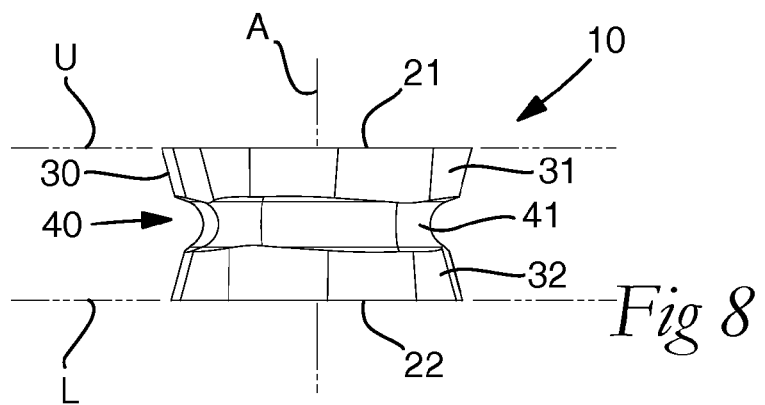
FIG. 8 discloses a side view of the cutting insert in FIG. 7.
Figure 9:
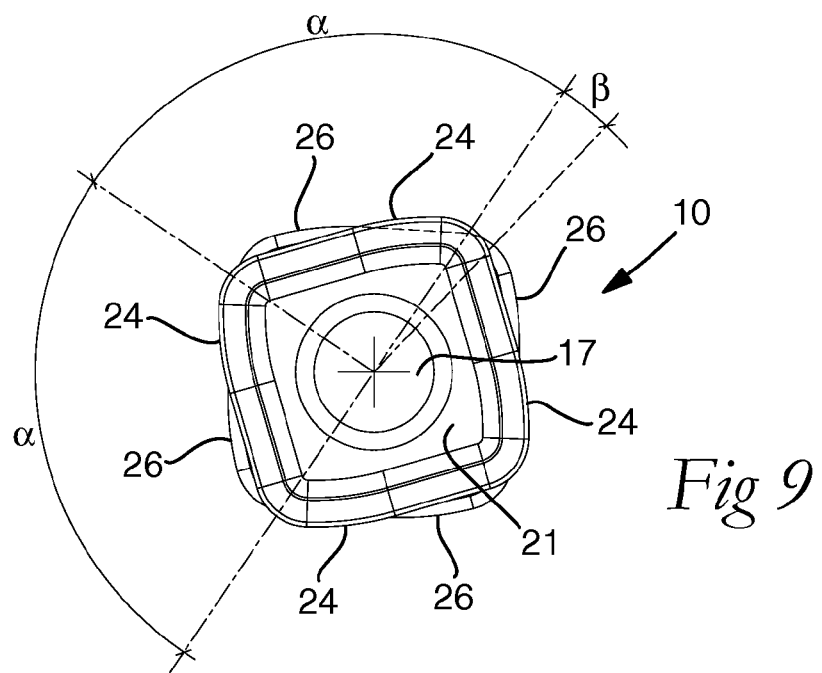
FIG. 9 discloses a front view of the cutting insert in FIG. 7.

FIGS. 7 to 9 disclose a second embodiment of the cutting insert 10 which differs from the first embodiment in that the transition portion comprises a groove 41 extending around the cutting insert 10. In other words, the transition area 40 is configured as a groove. Also in the second embodiment, the transition portion or the groove 41, has a uniform width along the length of the transition area 40. In contrast to the first embodiment, the groove has a significantly slighter wave-like shape seen in a direction parallel to the upper extension plane U and lower extension plane L.

Figure 10:
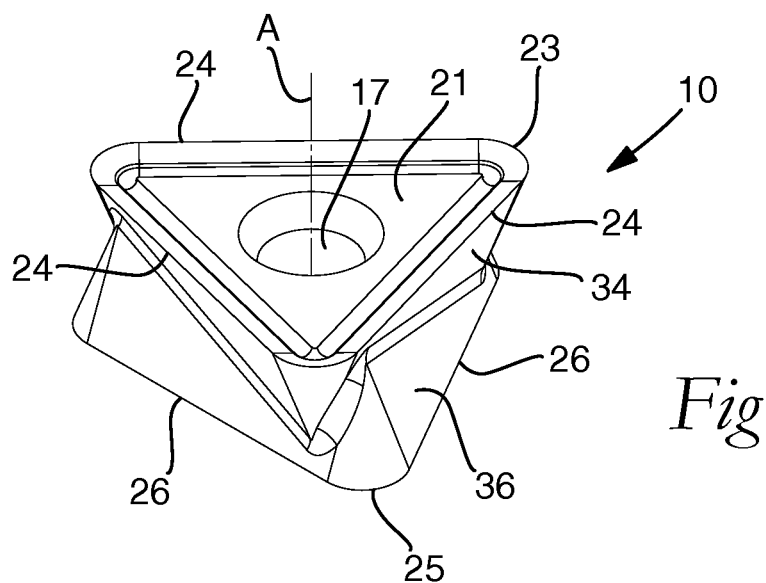
FIG. 10 discloses a perspective view of a cutting insert according to a third embodiment of the invention.
Figure 11:
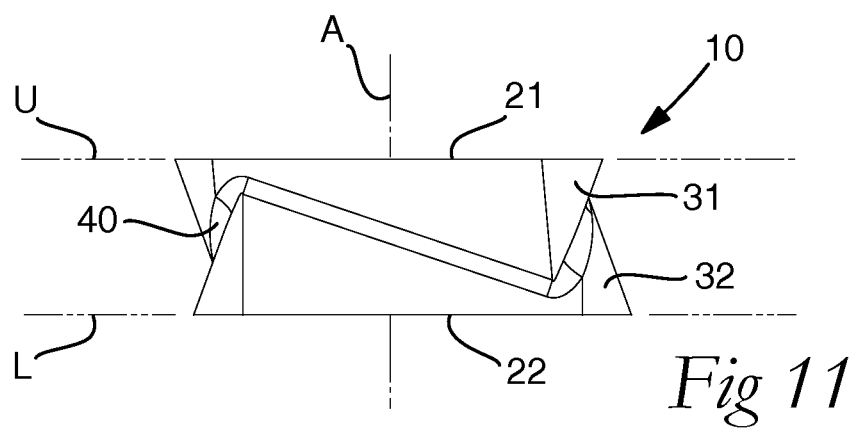
FIG. 11 discloses a side view of the cutting insert in FIG. 10.
Figure 12:
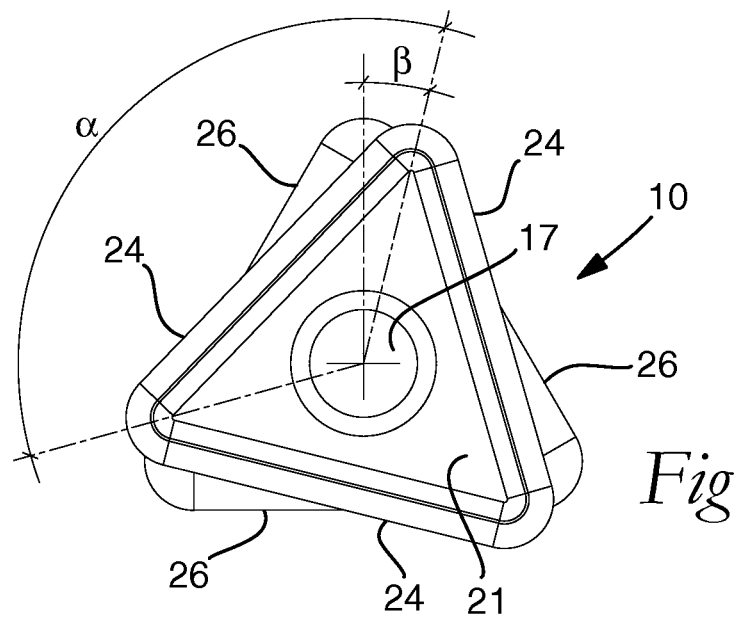
FIG. 12 discloses a front view of the cutting insert in FIG. 10.

FIGS. 10 to 12 disclose a third embodiment of the cutting insert 10 which differs from the first and second embodiments in that the cutting insert 10 has only three upper cutting edge portions 26 and three lower cutting edge portions 26, and thus an overall triangular shape, wherein the determined angle α is 120°. Also in the third embodiment, the transition area 40 has an irregular wave-like shape.

Figure 13:
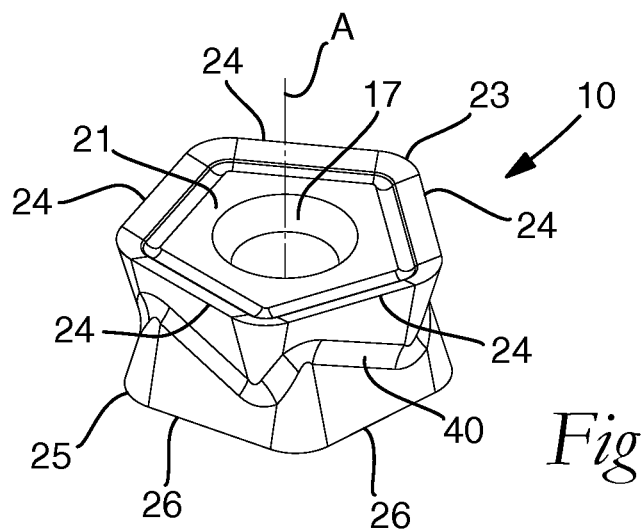
FIG. 13 discloses a perspective view of a cutting insert according to a fourth embodiment of the invention.
Figure 14:
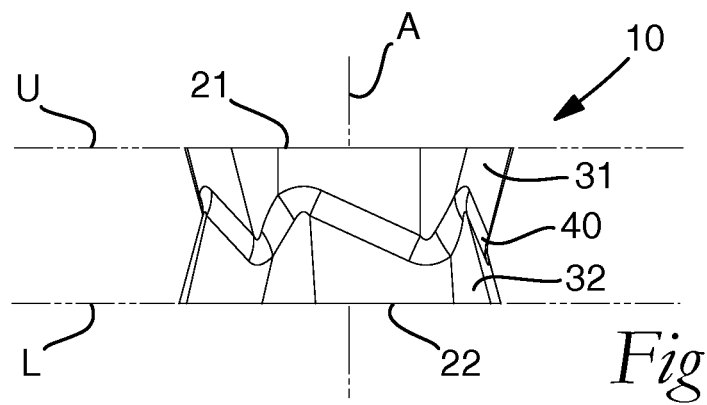
FIG. 14 discloses a side view of the cutting insert in FIG. 13.
Figure 15:
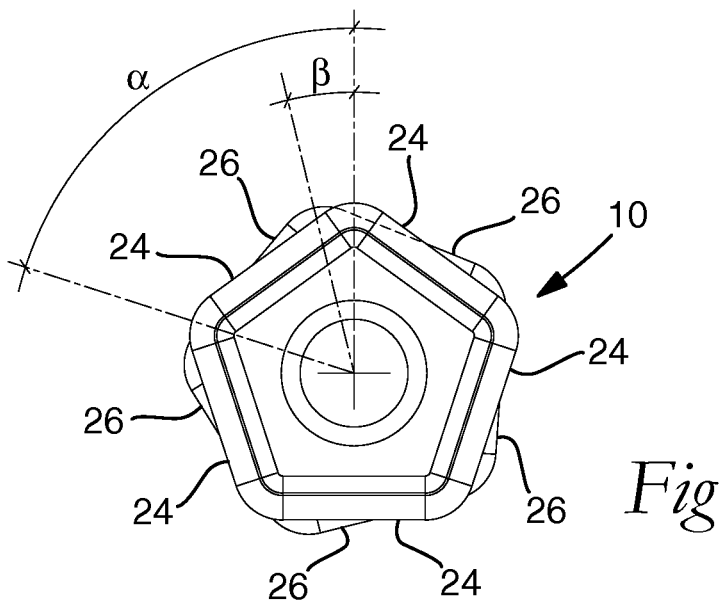
FIG. 15 discloses a front view of the cutting insert in FIG. 13.

FIGS. 13 to 15 disclose a fourth embodiment of the cutting insert 10 which differs from the previous embodiments in that the cutting insert 10 has five upper cutting edge portions 26 and five lower cutting edge portions 26, and thus an overall pentagonal shape, wherein the determined angle α is 72°. The transition area 40 has an irregular wave-like shape.

Figure 16:
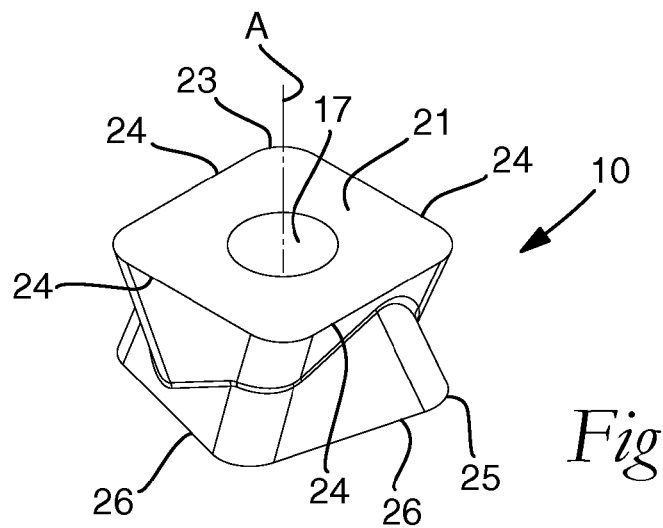
FIG. 16 discloses a perspective view of a cutting insert according to a fifth embodiment of the invention.
Figure 17:
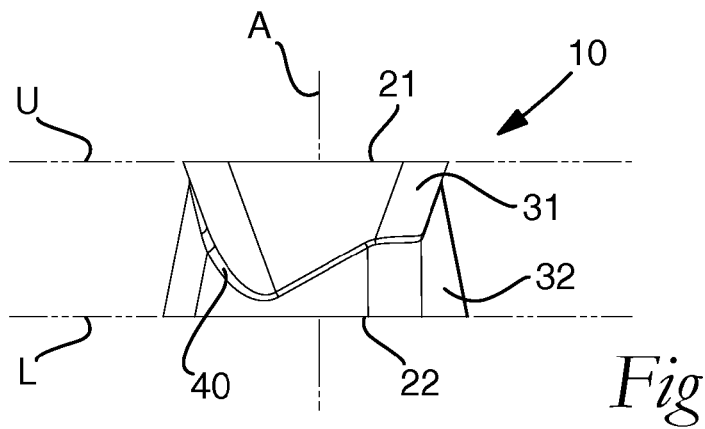
FIG. 17 discloses a side view of the cutting insert in FIG. 16.
Figure 18:
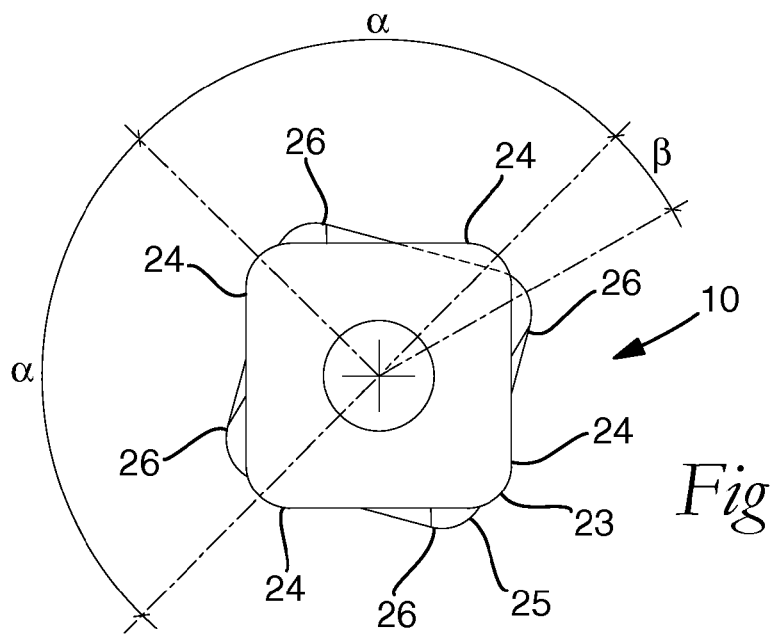
FIG. 18 discloses a front view of the cutting insert in FIG. 16.

FIGS. 16 to 18 disclose a fifth embodiment of the cutting insert 10 which differs from the first and second embodiments in that the cutting insert 10 has a plane upper side 21 and a plane lower side 22. Furthermore, in contrast to the first and second embodiments, the cutting edge portions 24, 26 are straight between the slightly bended ends. Moreover, in the fifth embodiment, the acute angle formed between the each upper side surface 34 and the upper extension plane U with respect to the associated upper cutting edge portion 24, and each lower side surface 36 and the lower extension plane L with respect to the associated lower cutting edge portion 26, is different for different side surfaces.

The invention is not limited to the embodiments disclosed but may be varied and modified within the scope of the following claims. For instance, it is possible to provide the cutting insert 10 with only two upper cutting edge portions and only two lower cutting edge portions. Preferably, the cutting edge portions will then be convexly curved. Furthermore, the cutting insert 10 may comprise more than five upper cutting edge portions and more than five lower cutting edge portions, for instance six, seven, eight or more.

The invention claimed is:

1. A cutting insert configured for chip-removing machining and for being mounted in a cutter body for face milling and ramping of a workpiece, comprising:

an upper side defining an upper extension plane;

a lower side defining a lower extension plane being parallel with the upper extension plane, wherein a center axis extends perpendicularly through the upper extension plane and the lower extension plane;

an upper cutting edge extending around the upper side and forming at least two upper cutting edge portions, each having a length corresponding to a determined angle with respect to the center axis;

a lower cutting edge extending around the lower side and forming at least two lower cutting edge portions, each having a length corresponding to said determined angle with respect to the center axis; and an edge side extending around the cutting insert, the edge side including a transition portion extending around the cutting insert and dividing the edge side into an upper side portion associated with the upper cutting edge and a lower side portion associated with the lower cutting edge, the upper side portion forming an acute angle with the upper extension plane, and the lower side portion forming an acute angle with the lower extension plane, wherein the cutting insert is indexable, to different index positions, for permitting cutting with at least one of the at least two upper cutting edge portions with the upper side forming a chip surface, or at least one of the at least two lower cutting edge portions with the lower side forming a chip surface, and wherein the length of each of the at least two upper cutting edge portions is equal to the length of each of the lower cutting edge portions, wherein each of the at least two upper cutting edge portions is displaced angularly with respect to the center axis in relation to one of the at least two lower cutting edge portions with a displacement angle being greater than zero and less than said determined angle, the upper cutting edge being configured such that one of the at least two upper cutting edge portions forms a main cutting edge and an adjacent upper cutting edge portion forms a minor cutting edge in one of said index positions, and wherein the lower cutting edge is configured in such that one of the at least two lower cutting edge portions forms a main cutting edge and an adjacent lower cutting edge portion forms a minor cutting edge in another one of said index positions.

2. A cutting insert according to claim 1, wherein the upper side portion comprises at least two upper side surfaces associated with a respective one of the at least two upper cutting edge portions, and wherein the lower side portion comprises at least two lower side surfaces associated with a respective one of the at least two lower cutting edge portions.

3. A cutting insert according to claim 2, wherein each of the at least two upper and lower side surfaces is configured to form a clearance surface in one of said index positions and configured to form a support surface in another of said index positions and thus to abut a support surface of said cutter body when being mounted in the cutter body.

4. A cutting insert according to claim 1, wherein the transition portion has a wave-like shape seen in a direction parallel to the upper and lower extension planes.

5. A cutting insert according to claim 1, wherein the transition portion comprises a groove extending around the cutting insert.

6. A cutting insert according to claim 1, wherein the displacement angle is greater than zero and less than 50% of said determined angle.

7. A cutting insert according to claim 1, wherein the at least two upper cutting edge portions and the at least two lower cutting edge portions are identical.

8. A cutting insert according to claim 1, wherein the upper cutting edge comprises three upper cutting edge portions and the lower cutting edge comprises three lower cutting edge portions.

9. A cutting insert according to claim 1, wherein the upper cutting edge comprises four upper cutting edge portions and the lower cutting edge comprises three lower cutting edge portions.

10. A cutting insert according to claim 1, wherein the upper cutting edge comprises five upper cutting edge portions and the lower cutting edge comprises three lower cutting edge portions.

11. A cutting insert according to claim 1, wherein the cutting insert is single-handed.

12. A milling tool comprising a cutter body and a plurality of cutting inserts, wherein the cutting inserts are mounted in the cutter body and configured to permit alternating face milling and ramping of a workpiece, each of said cutting inserts comprising:
an upper side defining an upper extension plane;
a lower side defining a lower extension plane parallel with the upper extension plane, wherein a center axis extends perpendicularly through the upper extension plane and the lower extension plane;
an upper cutting edge extending around the upper side and forming at least two upper cutting edge portions, each having a length corresponding to a determined angle with respect to the center axis;
a lower cutting edge extending around the lower side and forming at least two lower cutting edge portions, each having a length corresponding to said determined angle with respect to the center axis; and
an edge side extending around the cutting insert, the edge side including a transition portion extending around the cutting insert and dividing the edge side into an upper side portion associated with the upper cutting edge and a lower side portion associated with the lower cutting edge, the upper side portion forming an acute angle with the upper extension plane, and the lower side portion forming an acute angle with the lower extension plane, wherein the cutting insert is indexable, to different index positions, for permitting cutting with at least one of the at least two upper cutting edge portions with the upper side forming a chip surface, or at least one of the at least two lower cutting edge portions with the lower side forming a chip surface, and wherein the length of each of the at least two upper cutting edge portions is equal to the length of each of the lower cutting edge portions, wherein each of the at least two upper cutting edge portions is displaced angularly with respect to the center axis in relation to one of the at least two lower cutting edge portions with a displacement angle being greater than zero and less than said determined angle.

* * * * *